United States Patent Office 3,285,342
Patented Nov. 15, 1966

3,285,342
WELL FRACTURING
Luther C. Cronberger, Sanford, Mich., assignor to The Dow Chemical Company, Midland, Mich., a corporation of Delaware
No Drawing. Filed Jan. 8, 1964, Ser. No. 336,382
7 Claims. (Cl. 166—42)

This invention relates to materials for the treatment of wells, particularly those drilled into an oil- or gas-bearing formation. It more particularly concerns an improved material for use as a propping agent in the hydraulic fracture treatments of earth formations to facilitate the flow of oil and gas to wells drilled therein.

Hydraulic fracture treatment is one of the conventional methods currently in use for facilitating the flow of oil and gas from an earth formation to a well bore drilled therein. Such a treatment is basically the injection of a liquid into the earth, the injection being made under sufficient hydraulic pressure to produce cracks or fractures therein by hydraulic action. Aqueous and oil base liquids are used. Water, brine and acid solutions are common aqueous base liquids. Crude oil, or semi-refined oils having higher viscosities than most crude oils and chemically gelled oils make up the majority of oil base liquids. Emulsions of aqueous and nonaqueous liquids are also used. Generally chemical additaments are mixed with the liquids to retard filtration into the matrix of the formation being fractured, to prevent the formation of emulsions with the liquids native to the formation and in other ways enhance the liquids.

The fractures or cracks are held or propped open by including in the fracturing fluid a quantity of a granular insoluble solid which remains in the fractures after the injection pressure is released. Solids which have been used in this way include sand in particular, and lesser amounts of granules of shells and seeds such as walnut shells, metal granules and ceramic granules.

The use of these known agents in many treatments produces only minimal increases in oil and gas production from the wells. One cause for this is that the propping agents are crushed into small fragments by the overburden pressure of the formation when the hydraulic pressure on the injection fluid is discontinued. This is particularly true of sand and other agents which crush readily because they are not capable of plastic deformation. The small crushed fragments tend to pack together in the fracture and fail to maintain an adequately wide and unplugged fracture having the desired high flow capacity. This problem is encountered particularly in hard formations which crush the agents more readily because they are not substantially indented and do not permit much if any imbedment of the agent.

The use of metal granules which are capable of plastic flow and therefore do not fragment readily is an improvement in this area but metals have the disadvantage of being subject to corrosion and subsequent failure as propping agents. Many crude oils contain hydrogen sulfide and others contain short chain organic acids which are a source of corrosion. Most formations contain brines as well as petroleum, and the salt content of the brines reacts with aluminum granules to destroy the propping utility. Also, the corrosion products tend to plug the fractures. Wells which have been fracture treated using propping agents are oftentimes later retreated using acid to clean silt and scale deposits from the fractures; metal propping agents, particularly aluminum, are further corroded by these treatments.

Granules from seeds such as walnut hulls also are an advancement in the art inasmuch as such granules do not fail by fragmentation. Walnut hull granules crush under the pressure of the overburden and although the resulting permeability in the fracture may be better than with the use of sand as a propping agent, there is a need for agents which maintain fractures open at greater widths.

Substantial quantities of propping agents are used in well fracturing treatments. An average treatment will employ on the order of ten tons of agent, and treatments requiring fifty tons and over are not uncommon. As the wells are produced and require more stringent treatments to obtain satisfactory stimulation, and as wells in less productive areas are drilled, treatments of greater volume of liquid and propping agent are made. Consequently there is an increasing need for greater quantities of propping material. In the interest of economy and in conservation of natural resources, a need exists for an efficient propping agent of unlimited supply and of minimum intrinsic value.

Accordingly, the principal object of the invention is to provide a propping agent for use in hydraulically fracturing oil and gas bearing earth formations which is not subject to shattering and the accompanying fragmentation by the overburden pressure of hard formations.

Another object of this invention is to provide an improved method of propping fractures in subsurface formations.

A further object is to provide a propping agent which will hold the fractures in hard formations open to a greater degree than agents now available and thereby impart improved permeability to the fractures.

A further object is to provide a propping agent which is corrosion resistant and inert to the liquids native to oil and gas bearing formations, and to the liquids and chemicals used to improve the permeability of such formations.

A further object is to provide a propping agent made from materials available in large quantities with a minimum wastage of natural resources.

In addition, it is an object to provide an agent which is non-abrasive to the pump and connecting pipes by which the agents are introduced into the well formation. Abrasive propping agents cause excessive wear to the pumping equipment, thereby adding to the expense of treatments, as well as creating a safety hazard from failure of prematurely worn and weakened parts.

The invention is predicated upon the discovery that granules of certain of the shale rocks containing kerogen, commonly known as oil shale, function as improved propping agents in fractures in hard formations, holding the fractures apart to a greater extent than heretofore achieved when a fracturing fluid containing a propping agent is pumped down a well and into a formation under sufficient pressure to cause the formation to fracture.

The invention then consists of the improved material and method for propping open an hydraulically created fracture made to facilitate the flow of oil or gas from an earth formation to a well drilled therein. Other objects and advantages will become apparent as the description of the invention proceeds.

The use of oil shale in hydraulic fracturing is particularly suited to the creation of wide, high conductivity fractures in hard formations where brittle propping agents are crushed into small fragments by the overburden load. In formations which are not hard, that is, which are softer than the prop, the problem is lessened because the prop granules become imbedded within the formation, resulting in less stress upon the granules.

Oil shales are naturally-occurring substances which can be readily mined in large quantities. In general, oil shales are finely-divided materials made up of mineral and organic matter. The mineral matter ranges from pure quartz to highly calcareous matter including calcite and dolomite. The organic matter in oil shales is known as kerogen which, translated from the Greek, means a "producer of wax." It is a mixture of presumedly high molecular weight compounds made up of hydrogen, carbon, nitrogen, oxygen and sulfur. The oil shales range in kerogen characteristics from the benzenoid type, which closely resembles the structure of coals, to the non-benzenoid type which has little if any of the structural characteristics of coals. The non-benzenoid oil shales are suitable for use according to this invention.

The two chief oil shale formations in the United States, the Green River and the Chattanooga oil shales, are the non-benzenoid variety. They are satisfactory as propping agents where they exist as massive deposits, as contrasted to fissile deposits. The massive deposits break into granules which are roughly equal in the three primary dimensions whereas the fissile deposits break into paper-thin fragments; the latter are not adaptable as propping agents.

The Green River shale formation is found in Wyoming, Utah and Colorado. A specific deposit of the Green River shale is the Colorado Mahogany ledge deposit which has been the subject of considerable study as a commercial source of oil. It is a satisfactory oil shale for use as a propping agent.

The Chattanooga oil shale is found in Arkansas, Tennessee, Kentucky and Indiana and underlies most of the lower peninsula of Michigan, where it is usually known as the Antrim formation. Outcrops occur, for example, near Alpena, Michigan.

It might be thought by those skilled in the art that oil shale, like many other shales, would not be suitable as a material to put into formations because of possible softening and mudding if contact is made with water. Contrariwise, it was found in accordance with this invention that granules of Colorado oil shale and Antrim oil shales suffer no change in strength nor are they otherwise affected by oil well formation conditions. Six months exposure at 175° F. to fresh water, brine, kerosene or xylene, the latter constituting an overly severe simulation of an aromatic containing crude oil, had no effect.

This resistance of oil shale to particularly fresh water may be due at least in part to the aforementioned kerogen content which is believed to have a waterproofing effect upon the granules. At the same time the kerogen, apparently by virtue of being of high molecular weight, is not extracted or otherwise affected by organic solvents.

The foregoing tests are illustrative also of how the oil shale granules fill the need for a corrosion resistant granule; being a mineral rather than a metallic granule, the oil shale overcomes the inherent tendencies of metals to corrode in the presence of water and brines.

The oil shales are prepared for use as propping agents by breaking mined chunks into irregular particles or granules, rounding the granules by methods such as rolling and finally sieving. Improved permeability in the finally propped fracture is obtained by using particles of a narrow range of sizes, that is, particles of much the same size. Using sieves of the standard screen scale, a preferred particle size for most formations are those passing a No. 8 sieve and retained on a No. 12 sieve. It is feasible to use larger particles, up to those passing about a No. 4 sieve and retained on about a No. 8, commonly called 4–8 mesh size, where the fractures in the formation may be forced open sufficiently wide to readily accept the props. Such is usually true in the more shallow wells, at depths of less than about 4000 feet.

As the formations become more difficult to open, as at greater depths, smaller granules are required to allow injection without bridging and finally plugging within the well bore. Oil shale granules of a size as small as 30–40 mesh size may be employed in the scope of this invention in such instances. A narrow range of sizes is again preferable to obtain a maximum degree of permability to liquid within the formation, although a range as broad as about 20–40 mesh size is entirely operable within the scope of this invention.

The use of oil shale granules as propping agents is particularly adapted to hydraulic fracturing treatments wherein the propping agent is distributed within the fracture as a partial monolayer. In this concept of utilizing a propping agent, the hydraulic fracturing treatment is engineered and carried out to create a fracture and place therein less of the propping agent than that required to fill the fracture with a single layer of the prop. The particles of propping agent are scattered about in the fracture in accordance with known engineering and well treating processes and consequenlty offer a minimum of resistance to flow liquids through the fracture. This concept is in contrast to a packed fracture, wherein as much of the propping agent as possible is placed within the fracture, usually in multilayers. Sand has been commonly used in this fashion, but particularly in hard formations, the sand crushes. When this occurs the fracture offers considerable resistance to fluid flow.

Just as those skilled in the art might not expect oil shales to be unaffected by aqueous and organic solvents, so might oil shale granules, like sand, many common shales and other rock particles, be expected to exhibit cleavage planes which would result in fragmentation under high pressure. But contrariwise again, it was found in accordance with this invention that oil shale granules do not fragment but rather undergo substantial plastic deformation.

The advantage of using oil shale granules as a propping agent to create more widely spaced fractures as contemplated by the present invention may be illustrated by a comparison of the widths of fractures containing like quantities and sizes of oil shale granules and other granules, when the fractures are compressed under a simulated overburden load. The data of the following table are from tests wherein granules of the props being tested were placed between hardened flat steel plates at a concentration of 10 granules per square inch. The plates were pressed together at specified pressures, and measurements were made of the width by which the plates were held or propped apart by the granules. Thus, in the test the granules act as props in the fracture of a hard formation to prop the fracture open against an overburden pressure or load.

DATA TABLE

| Test | Pounds Load per Granule | Equivalent Well Depth Feet | Propped Fracture Width, Inches, Using Granules Passing an 8 Mesh and Retained on a 12 Mesh Sieve, 10 Granules per Square Inch of Fracture | | | | | |
|---|---|---|---|---|---|---|---|---|
| | | | Oil Shale | Walnut Shells | Aluminum | Gray Shale | Green Shale | Sand |
| 1 | 200 | 1,500–3,200 | .027 | .025 | .023 | .016 | .015 | .005 |
| 2 | 300 | 3,200–5,000 | .025 | .022 | .019 | .015 | .014 | .005 |
| 3 | 400 | 4,500–7,000 | .023 | .020 | .016 | .014 | .013 | .004 |
| 4 | 500 | 6,000–8,500 | .022 | .019 | .014 | .014 | .013 | .004 |
| 5 | 600 | 7,200–10,200 | .022 | .018 | .013 | .013 | .012 | .004 |
| 6 | 700 | 8,500–12,000 | .021 | .017 | .012 | .013 | .012 | .004 |
| 7 | 800 | 9,500–13,000 | .020 | .016 | .011 | .012 | .011 | .003 |
| 8 | 900 | 11,000–15,000 | .020 | .015 | .011 | .011 | .011 | .003 |

Granules of walnut shells and aluminum are used in accordance with the known art as propping agents in treatments where the purpose is to create a partial monolayer of agent within a fracture in a hard formation. It is seen from the data table that oil shale granules are superior to these materials as it was found the granules of oil shale propped the fracture open to a significantly greater width.

Sand is the most commonly used propping agent in the art of fracturing. It was included in work shown in the data table as a control test for comparative purposes.

The data using shales identified as gray shale and green shale are illustrative of the qualities of oil shale for maintaining a widely propped fracture over common shales. The gray shale and green shale are examples of non-kerogen containing common shales occurring in eastern Oklahoma.

The massive non-benzenoid oil shales suitable for propping agents are satisfactorily non-abrasive to steel pumps and accessory equipment in accordance with this invention. The oil shale granules are more soft than the steel, being of a mineral hardness according to Mohs' scale of about 2, more or less. Steel correspondingly is in the range of 5–6 while the commonly used propping agent, quartz sand, is 7. Pumping sand laden slurries during hydraulic fracturing treatments causes severe wear, especially at elbows in the pipes connecting the pump to the well.

In the art of fracturing formations wherein a partial monolayer of propping agent is created, various means are known to achieve the partial monolayer placement. One method applicable in formations where the hydraulic fracture treating characteristics are well known is to use a treating technique which will result in a partial monolayer being formed. In such a treatment the width of the fracture which is created, the rate of loss of fracturing liquid to the body of the formation, the prop carrying ability of the liquid, the flow rate of the fluid in the fracture, and other factors are considered and balanced according to known engineering practices to produce a partial monolayer of propping agent.

Another known method of creating a partial monolayer is to dilute the propping agent granules with granules of a material which is readily removable from the fracture after emplacement, leaving in place the propping agent. Thus, it is known to carry out hydraulic fracturing treatments using oil base liquids with water soluble prop diluents and similarly to use water base liquids and oil soluble diluents. The emplacement stage is followed by a flush stage of the liquid designed to remove the diluent or, depending upon the circumstances, production of liquid by the formation may be relied upon. Various proportions of diluent agent to propping agent may be used, depending upon the formation conditions. A ratio of 3 diluent to 1 of prop is representative. A known water soluble diluent is granules of urea. Urea is commonly made in granule or pellet form for use as a soil fertilizer, and can be supplied in various particle sizes; the diluent is desirably the same particle size as the propping agent to minimize segregation.

In an embodiment of the invention, the well to be treated is made ready by isolating the zone under consideration. This may be done by perforating the well casing at the particular depth, or by the use of packers or by other conventional means. A treating liquid, crude oil gelled with the sodium salt of fatty acids according to U.S. Patent 2,914,476, is then injected into the formation to make certain the rock will fracture satisfactorily and accept the liquid at the desired rate when propping agent is added to the liquid. A decrease in injection pressure indicates a fracture has been created. When this occurs there is added to the gelled oil a mixture of one part 8–12 mesh size rounded Antrim shale granules with 3 parts 8–12 mesh size urea granules at a concentration of about 2 pounds per gallon of gelled oil. Pumping is continued to carry the oil shale prop granules and urea diluent into the opened fractures and to create new and extended fractures into which oil shale granules and urea are deposited. After pumping is stopped, the gelled crude oil thins because of contact with the native formation liquids, crude oil or brine. The well is placed into production briefly to withdraw the fracturing liquid from the fractures. This is followed by the injection and return of fresh water in an amount about equal to the volume used to carry in the prop and diluent to dissolve and carry out the urea diluent. Production of the native liquids is carried on through fractures which in accordance with this invention are now widely propped open.

It is to be recognized that the foregoing description of an embodiment of the invention is by way of illustration only and that various changes can be made in the operational and maniuplative techniques of the hydraulic fracturing process without departing from the invention. For example, the treatment may be designed to prop a fracture without the use of the diluent. Moreover, the principles of the invention can be applied to hydraulic fracturing operations which are combined with other types of treatments associated with hydraulic fracturing. Furthermore, the principles of the invention can be advantageously applied to the treatment of injection and disposal wells.

I claim:
1. A process for hydraulically fracturing a subterranean formation penetrated by a well and propping apart the resulting fractures comprising forcing a liquid suspension of granules of oil shale down said well and into said formation under sufficient pressure to fracture said formation.

2. A process according to claim 1 wherein a partial monolayer of said granules of oil shale is created in at least a portion of said fractures.

3. A process according to claim 1 wherein said oil shale particles are substantially round and are formed from a massive, non-benzenoid, kerogen containing shale.

4. A process according to claim 3 wherein the size of said oil shale granules is between about 8 and about 40 mesh size.

5. A process according to claim 4 wherein the hardness of said formation is greater than that of said oil shale granules, causing significant crushing of said granules rather than noticeable indentation of said formation.

6. A process according to claim 4 wherein said oil shale granules are formed from a formation of the group consisting of Green River oil shale and Chattanooga oil shale.

7. A process for hydraulically fracturing subterranean formations penetrated by a well comprising forcing a fracturing liquid down said well, creating fractures in said formation and forcing into said fractures a liquid suspension of granules of oil shale.

References Cited by the Examiner

UNITED STATES PATENTS

| | | | |
|---|---|---|---|
| 2,969,226 | 1/1961 | Huntington | 166—42.1 |
| 3,149,673 | 9/1964 | Pennington | 166—42.1 |
| 3,173,484 | 3/1965 | Huitt et al. | 166—42.1 X |
| 3,175,615 | 3/1965 | East et al. | 166—42.1 |
| 3,179,170 | 4/1965 | Burtch | 252—8.55 |
| 3,195,635 | 7/1965 | Fast | 166—42.1 |

CHARLES E. O'CONNELL, *Primary Examiner.*

D. H. BROWN, *Assistant Examiner.*